June 16, 1964            F. BORNEFELD            3,137,019
PRODUCING PISTON RINGS HAVING CURVED CYLINDER BEARING FACES
Filed Jan. 18, 1962            2 Sheets-Sheet 1
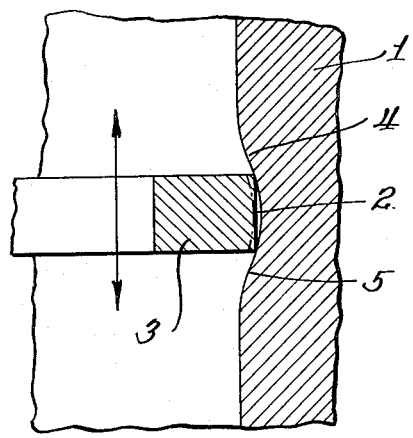
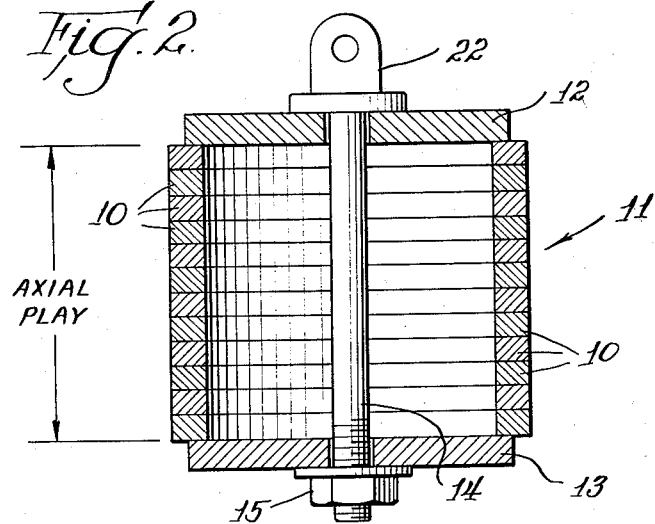
INVENTOR.
Fritz Bornefeld
BY
Atty.

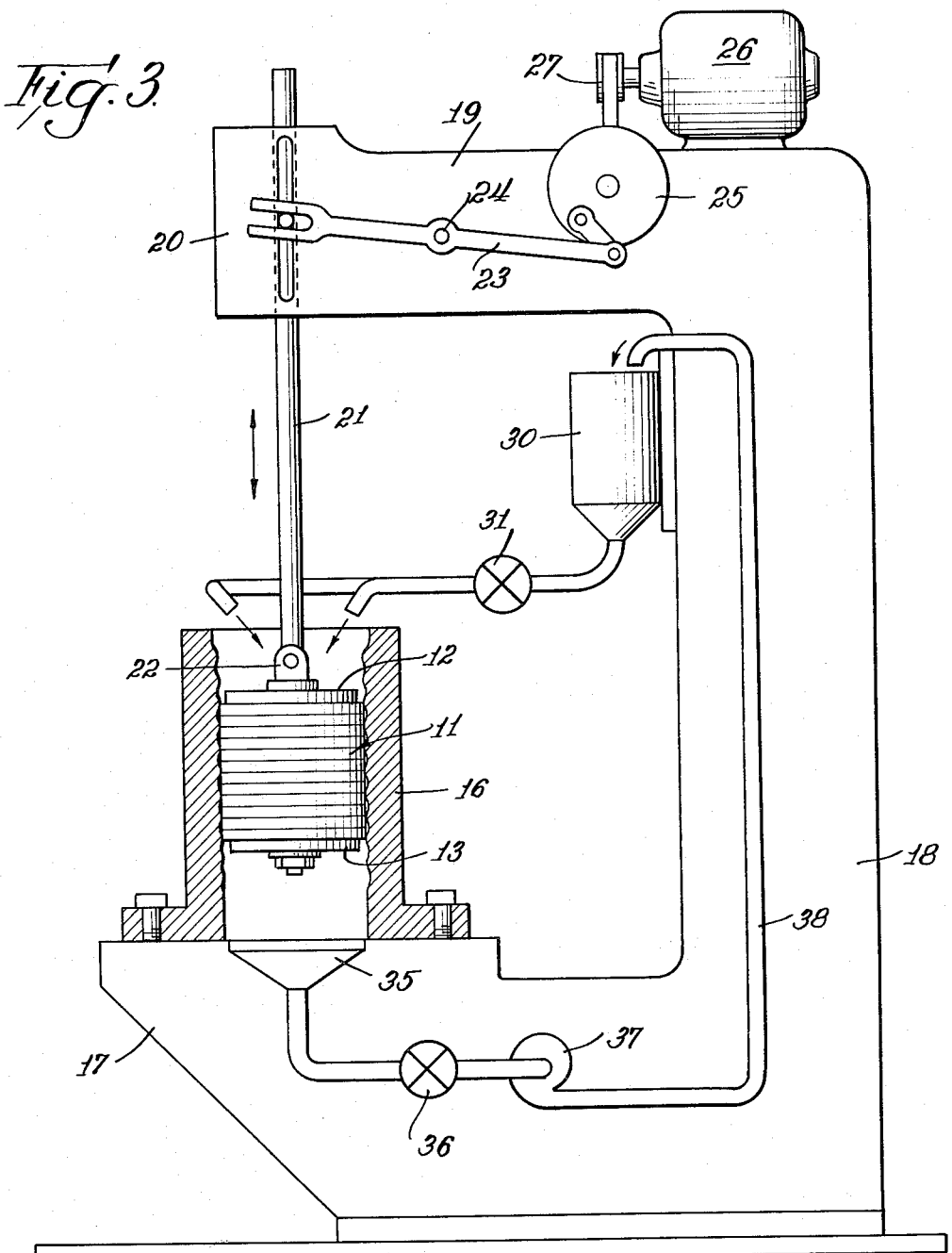

3,137,019
PRODUCING PISTON RINGS HAVING CURVED CYLINDER BEARING FACES

Fritz Bornefeld, Burscheid, near Cologne, Germany, assignor to Goetzewerke Friedrich Goetze Aktiengesellschaft, Burscheid, near Cologne, Germany, a corporation of Germany
Filed Jan. 18, 1962, Ser. No. 167,024
Claims priority, application Germany Jan. 19, 1961
6 Claims. (Cl. 51—157)

The invention disclosed herein is concerned with an improved method of and a device for producing piston rings having curved cylinder bearing faces.

Piston rings of this kind provide the advantage of slowing the running-in operation, which is particularly true in the case of chromium plated piston rings. Moreover, sufficient oil is fed to the cylinder bearing face of such a piston ring, during the running-in period, thus preventing freezing thereof.

Such piston rings were heretofore produced in rather cumbersome manner, requiring honing of piston rings assembled in a package, in a first operation, on a lathe, thereafter exchanging the end rings of the package, and thereupon again honing the rings of the entire package. This procedure also occasions considerable difficulties in the forming of the desired curvature of the cylinder bearing faces of the piston rings.

The present invention proposes an improved procedure for making such piston rings, comprising cutting (splitting) the rings in known manner, assembling a plurality of such split rings in a holder therefor, said holder having two end plates or disks between which the rings are positioned with play in axial direction, pressing the resulting package of rings into a honing cylinder having a grooved or undulated inner wall with a diameter corresponding approximately to the inner diameter of an engine cylinder in which the piston rings are to be used, the faces of the rings now lying in resilient pressure engagement with the inner wall of the honing cylinder due to the inherent radial tension thereof which results from the splitting, and thereupon moving the holder with the package of rings in a reciprocating axial motion within the honing cylinder, or, vice versa, reciprocating the honing cylinder with respect to the package of rings contained therein, so as to impart to the cylinder bearing faces of the piston rings the desired curved or arcuate shape. The operation is greatly facilitated by the axial play of the piston rings in the holder.

Piston rings which are to be provided with wear resistant coating at the piston bearing faces thereof, for example, by chromium plating, may be honed either before or after the plating so as to impart to the cylinder bearing faces thereof the desired curved or arcuate shape.

A particularly advantageous device for practicing the method according to the invention comprises a honing cylinder with an inner wall having one or more radially directed annularly extending recesses or grooves formed therein. The side walls or flanks of the recess or recesses slope gently with respect to the general plane of the inner wall of the honing cylinder and the base thereof is sharply defined or rounded. The inner wall of the honing cylinder may thus be constructed in undulating manner. The curved configuration is imparted to the cylinder bearing faces of the piston rings by the honing or rubbing action effected as a result of the reciprocating relative motion between the rings and the undulating inner wall of the honing cylinder, whereby the cylinder bearing faces of the piston rings are caused to move back and forth along the sloping flanks of the honing grooves, in resilient pressure engagement therewith. A plurality of piston rings assembled in a package can in this manner be honed at the same time; attention must however be paid in such case that the rings have sufficient axial play in the holding device provided therefor.

The various objects and features of the invention will appear from the description which is rendered below with reference to the accompanying drawing, showing in diagrammatic manner means for practicing it.

FIG. 1 shows in cross-sectional schematic view a part of a piston ring in position relative to the grooved inner wall of a honing cylinder, during the honing operation;

FIG. 2 illustrates in part sectional view a plurality of piston rings assembled in a holder to form a package ready for the honing operation; and FIG. 3 represents in part sectional view a machine for performing the honing of piston rings assembled in a package such as shown in FIG. 2.

Referring now to FIG. 1, numeral 1 indicates the wall of a honing cylinder the bore of which is provided with a radial recess or groove 2, the side walls or flanks 4 and 5 of such recess sloping gently and merging with the general plane of the cylinder bore, and the base of the recess being well defined and rounded. The base of the recess may however be of angular configuration. Numeral 3 indicates a split piston ring which is by suitable means, such as indicated for example in FIG. 3, reciprocated in the direction of the arrow. The stroke of reciprocation is such that the cylinder bearing face of the piston ring moves in each direction once with respect to the recess. The piston ring 3 is, due to being split, tensioned radially, tending to spread apart, and the piston bearing face thereof is accordingly in resilient pressure engagement with the inner wall of the bore of the honing cylinder, snapping during each reciprocation into the recess 2 and thus rubbing against the sloping flanks 4 and 5 thereof. The cylinder bearing face of the piston ring 3 is in this manner honed to provide the curved face indicated in dot-dash lines.

Honing fluid is conducted into the honing cylinder in suitable manner, for example, as indicated in FIG. 3.

The honing cylinder in this as well as in the remaining embodiments may be made of cast iron or steel. If desired, the honing surface of the bore may also be provided with a suitable special coating to facilitate the honing operation.

The piston rings may be honed in this manner individually, which is, however, uneconomical. A plurality of split piston rings are therefore preferably assembled to form a package (such as shown in FIG. 2) which is inserted into the honing cylinder 1 shown in FIG. 1 and reciprocated as described. The piston rings of the package have axial play, and each ring will therefore move once axially with respect to the honing recess 2, with each stroke of reciprocation, again resulting in the formation of the arcuate or curved cylinder bearing face. Such procedure is, however, likewise inefficient as it requires a relatively long reciprocating stroke, prolonging the honing time.

In accordance with a further object and feature, the invention therefore contemplates to hone a plurality of split piston rings assembled in a package, within a honing cylinder having a plurality of radial grooves or recesses forming a bore with undulating surface. The number of honing grooves or recesses formed in the bore of the honing cylinder is such that each ring moves with its cylinder bearing face at least once with respect to one groove.

It may be mentioned at this point that the curved configuration can be imparted to the cylinder bearing faces of the piston rings assembled in a package, without using for the honing operation grooves formed in the bore of the honing cylinder. This is possible owing to the fact that the piston rings of the package formed thereby have axial play and can therefore shift angularly out of the radial plane during the reciprocating honing motion, engaging the inner wall of the honing cylinder with resilient radial pressure, and thereby receiving in rubbing action with the wall of the bore of the honing cylinder the desired curved shape of the cylinder bearing faces. However, the honing grooves or recesses formed in the wall of the bore of the honing cylinder facilitate and shorten the honing operation considerably.

FIG. 2 shows a plurality of split piston rings 10, assembled to form a package 11 for the honing thereof. The piston rings 10 are disposed with axial play between disks 12 and 13, upon a holder comprising the bolt 14 on which they are held by suitable means such as a nut 15. The disk 12 may be fixedly secured to the bolt 14 by suitable means, for example, by welding or by a shoulder provided on the bolt. The diameter of the disks 12 and 13 is somewhat smaller than the inner diameter of the honing cylinder. An annular leaf spring may be inserted between one or both of the disks 12 and 13 and the piston ring disposed adjacent thereto so as to facilitate the assembly of the rings 10 between the disks 12 and 13. However, such leaf spring is not absolutely necessary owing to the inherent tension of the split piston rings.

The package of piston rings shown in FIG. 2 is pressed into the honing cylinder 16 which is mounted on the table 17 of the honing machine shown in FIG. 3. The bore of the honing cylinder 16 is provided with radial grooves or undulations as shown. The machine is provided with an upright 18 having a lateral arm 19 which terminates in a head member 20 containing a spindle 21 disposed for exact vertical rectilinear reciprocating motion in the directions of the arrows, the spindle 21 being connected with the eyelet 22 of the package 11 of the piston rings 10. The spindle 21 is reciprocated by a lever 23 pivoted at 24, such lever 23 being journalled to an eccentric 25 which is rotated by the action of a motor 26 with the aid of suitable transmission means 27 which is diagrammatically indicated in simplified manner and which may be in the form of a suitably arranged gear or belt drive or the like. It is of course understood that other suitable means may be provided for rectilinearly reciprocating the package of piston rings, and that drive means of different kind may likewise be used.

Numeral 30 indicates a receptacle containing a suitable honing fluid which may be in the form of a known lubricant containing a known and suitable grinding or honing agent. The honing fluid is conducted to the honing cylinder over a valve 31. If desired, grooves or channels (not shown) may be suitably provided in the honing cylinder 16 for holding honing fluid. The spent honing fluid flows into a collector 35 from which it may be circulated back to the receptacle 30 over a valve 36, a pump 37 and the line 38 as may be needed.

Changes may be made within the scope and spirit of the appended claims which define what is believed to be new and desired to have protected by Letters Patent.

I claim:

1. A method of producing piston rings with curved cylinder bearing faces, comprising axially reciprocating a split piston ring with its cylinder bearing face in resilient pressure engagement with the bore of a honing cylinder in which is formed an annular radially directed honing groove of a greater axial width than the corresponding width of the ring, so as to cause the cylinder bearing face of said piston ring to span a portion of said groove and rub against the flanks thereof to hone such face so as to assume curved configuration.

2. A method of producing piston rings with curved cylinder bearing faces, comprising assembling a plurality of split piston rings to form a package in which said piston rings have axial play, inserting said package of piston rings into the bore of a honing cylinder, and axially reciprocating said split piston rings with the cylinder bearing faces thereof in resilient pressure engagement with an annular radially directed honing groove formed in the wall of the bore of the honing cylinder, whereby the cylinder bearing faces of said piston rings are honed to form the curved faces thereof.

3. A device for honing the cylinder bearing faces of piston rings so as to impart thereto a curved configuration, comprising a holder for holding a split piston ring which is to be honed, a honing cylinder for receiving the piston ring held by said holder, said honing cylinder having a bore provided with a radially directed annularly extending honing groove of an axial width greater than the corresponding width of the ring, and means for axially reciprocating said holder with said split piston ring with respect to said honing groove, whereby said split piston ring is caused to pass along said groove spanning a portion of the latter in rubbing resilient pressure engagement with the flanks thereof to impart to the cylinder bearing face the desired curved configuration.

4. A device for honing the cylinder bearing faces of piston rings so as to impart thereto a curved configuration, comprising a holder for holding with axial play a package of a plurality of split piston rings which are to be honed, a honing cylinder having a bore for receiving said package of split piston rings, said bore having a plurality of annular radially directed honing grooves formed therein, and means for axially reciprocating said package so as to move the cylinder honing face of each piston ring at least once with respect to the flanks of a honing groove, whereby arcuate configuration is imparted to the cylinder bearing face of each piston ring.

5. A device according to claim 4, comprising means for rectilinearly reciprocating said package of piston rings.

6. A device according to claim 4, comprising means for rectilinearly reciprocating said package of piston rings, and means for circulating through said housing cylinder a suitable honing fluid.

References Cited in the file of this patent

UNITED STATES PATENTS

| | | |
|---|---|---|
| 2,318,837 | Connor | May 11, 1943 |
| 2,344,924 | Ryder | Mar. 21, 1944 |
| 2,713,235 | Borzym | July 19, 1955 |